(12) United States Patent
Chikazawa et al.

(10) Patent No.: US 7,379,569 B2
(45) Date of Patent: May 27, 2008

(54) FINGERPRINT RECOGNIZING APPARATUS AND INFORMATION PROCESSING UNIT HAVING SUCH APPARATUS

(75) Inventors: Nagahisa Chikazawa, Kawasaki (JP); Koichi Inoue, Kawasaki (JP); Shigeki Tanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1090 days.

(21) Appl. No.: 09/811,526

(22) Filed: Mar. 20, 2001

(65) Prior Publication Data

US 2002/0044675 A1 Apr. 18, 2002

(30) Foreign Application Priority Data

Oct. 13, 2000 (JP) ............................ 2000-314072

(51) Int. Cl.
*G06K 9/00* (2006.01)

(52) U.S. Cl. ..................................................... 382/124

(58) Field of Classification Search ........ 382/124–127; 361/600; 455/575.1
See application file for complete search history.

(56) References Cited

U.S. PATENT DOCUMENTS

| | | | | |
|---|---|---|---|---|
| 5,058,743 A | * | 10/1991 | Marsh et al. ................ | 206/719 |
| 5,218,760 A | * | 6/1993 | Colton et al. .................. | 29/845 |
| 5,684,271 A | * | 11/1997 | Scholder et al. ........... | 174/35 R |
| 5,828,773 A | | 10/1998 | Setlak et al. | |
| 5,940,526 A | * | 8/1999 | Setlak et al. ................. | 382/124 |
| 6,088,585 A | * | 7/2000 | Schmitt et al. .............. | 455/411 |
| 6,091,082 A | * | 7/2000 | Thomas et al. ................ | 257/77 |
| 6,208,264 B1 | * | 3/2001 | Bradney et al. .............. | 340/5.2 |
| 6,285,536 B1 | * | 9/2001 | Holberg et al. ................ | 361/56 |
| 6,337,918 B1 | * | 1/2002 | Holehan ...................... | 382/124 |
| 6,382,416 B1 | * | 5/2002 | Gainey ........................ | 206/317 |
| 6,509,847 B1 | * | 1/2003 | Anderson ..................... | 341/34 |
| 6,542,997 B1 | * | 4/2003 | Rolls et al. .................. | 713/324 |
| 6,686,546 B2 | * | 2/2004 | Chiu ........................ | 178/18.01 |
| 6,787,388 B1 | * | 9/2004 | Chiu ........................... | 438/106 |
| 6,871,242 B1 | * | 3/2005 | Ho-Lung et al. ........... | 382/125 |
| 6,950,541 B1 | * | 9/2005 | Setlak et al. ................. | 382/126 |
| 6,970,584 B2 | * | 11/2005 | O'Gorman et al. ......... | 382/126 |
| 7,139,414 B1 | * | 11/2006 | Suzuki et al. ............... | 382/126 |

(Continued)

FOREIGN PATENT DOCUMENTS

EP 0 9 23 018 A2 12/1998

(Continued)

OTHER PUBLICATIONS

DOS/V Magazine 2000 vol. 9 No. 19, Oct. 15, by Soft Bank Publishing, p. 116-119, English Translation.

*Primary Examiner*—Colin LaRose
(74) *Attorney, Agent, or Firm*—Westerman, Hattori, Daniels & Adrian, LLP.

(57) ABSTRACT

A fingerprint recognizing apparatus including a sensor section mounted on the apparatus body for detecting a fingerprint of an operator; a cover movable between an open position and a closed position for protecting the sensor section in such a manner that an operator's finger can access to the sensor section when the cover is in the open position; and a contact section arranged on the apparatus body at a position where the operator's finger can easily come into contact therewith during an operator's action to open the cover, the contact section being electrically connected to the ground of the apparatus body.

15 Claims, 8 Drawing Sheets

U.S. PATENT DOCUMENTS

| | | | |
|---|---|---|---|
| 2002/0097059 A1* | 7/2002 | Tartagni et al. | 324/687 |
| 2003/0035572 A1* | 2/2003 | Kalnitsky et al. | 382/124 |
| 2003/0107097 A1* | 6/2003 | McArthur et al. | 257/414 |
| 2003/0136043 A1* | 7/2003 | Lauster et al. | 42/70.11 |

FOREIGN PATENT DOCUMENTS

| | | |
|---|---|---|
| EP | 1 017 009 A2 | 7/2000 |
| EP | 1 018 696 A2 | 7/2000 |
| JP | A 9 330140 | 12/1997 |
| JP | A 11 175478 | 7/1999 |
| JP | A 11 185016 | 7/1999 |
| JP | A 2000 194830 | 7/2000 |
| JP | 2001005951 A * | 1/2001 |
| JP | 2001256488 A * | 9/2001 |
| JP | 2001357390 A * | 12/2001 |
| WO | WO 00/21439 | 4/2000 |

\* cited by examiner

FINGERPRINT RECOGNIZING APPARATUS AND INFORMATION PROCESSING UNIT HAVING SUCH APPARATUS

BACKGROUND OF THE INVENTION

1. Field of the Invention

The present invention relates to a fingerprint recognition device. More particularly, the present invention relates to a device for authenticating a person by the person's fingerprints which is applicable to a desk-top type, lap-top type or note type information processor, for example, applicable to various information processors such as a personal computer, cellular phone and so forth.

It is well known that a person can be very accurately recognized by his fingerprints. On the other hand, when the fingerprints of the person are processed by a fingerprint recognition device, static electricity conducted by the person's fingers affects the fingerprint recognition device. Therefore, it is necessary to take a countermeasure for preventing the static electricity from affecting the fingerprint recognition device.

2. Description of the Related Art

In the information processor, in order to prevent a stranger from gaining access to a person's information or in order to prevent a stranger from processing information by using a person's name, there is conventionally provided a system for authenticating the person by his fingerprints. Several examples of the information processor having such fingerprint recognition function will be explained below.

Japanese Unexamined Patent Publication No. 11-185016 discloses the following information processor. In order to avoid conducting operation of turning on and off an electric power source and also in order to avoid giving a command to start collating fingerprints, when a user presses his finger against a fingerprint detecting section, a shadow formed by the finger, which has been pressed against the fingerprint detecting section, is detected by a sensor section. When it is judged that the profile of the shadow has a distribution of the shadow formed by the finger, the electric power source is turned on. After that, a fingerprint is detected from the finger, which has been pressed against the fingerprint detecting section, and collated to the fingerprint data which has been previously stored. Due to the foregoing, the detected fingerprint is distinguished, that is, the user can be distinguished. Therefore, various data which agree with the thus distinguished user can be utilized in this information processor.

Japanese Unexamined Patent Publication No. 11-175478 (EP 0923018) discloses the following person authenticating system. In order to reduce the dimension of an input device and in order to prevent a stranger from using the information processor, the information processor comprises a computer, input device and fingerprint data base. The input device includes a keyboard, fingerprint sensor integrated with the keyboard, display, adapter circuit and fingerprint collating device. Only when information of a fingerprint detected by the fingerprint sensor coincides with information of a fingerprint stored in the fingerprint data base, log-on processing and data encoding processing are conducted.

According to Japanese Unexamined Patent Publication No. 9-330140, in order to ensure security without using a troublesome password, the keyboard includes a fingerprint reading section 1, and the computer body includes a fingerprint collating section and fingerprint storing section, and data is displayed on CRT. When an operator is going to operate the computer, he presses his finger against the fingerprint reading section. The fingerprint reading section reads the fingerprint with a beam of light sent from the inside and sends the fingerprint data to the fingerprint collating section of the computer body. If the thus sent fingerprint data is recognized to be the same as fingerprint data which has already been registered, operation of log-in to the personal computer 2 can be allowed.

A mouse type input device disclosed in Japanese Unexamined Patent Publication No. 2000-194830 includes: a sensor for detecting individual body distinguishing information, arranged so as to be capable of coming into contact with the mouse from the outside; an electrode arranged at a position on the mouse easily coming into contact with the user's hand; and a means for supplying an electrical potential of the ground to the electrode. Static electricity charged to the user's body and static electricity generated when the mouse is operated can be discharged by the grounded electrode of the information processor. Therefore, it is possible to detect individual distinguishing information, the S/N ratio of which is high.

Specifically, static electricity can be discharged as follows. The electrode is arranged at a position on the mouse with which the user's hand can be easily contacted. When the user's hand comes into contact with the electrode in the case of operating the mouse, static electricity charged to the user's body can be discharged to the reference voltage (ground) on the information processor side. Accordingly, there is no possibility that malfunction is caused in the distinguishing function of the fingerprint sensor by the noise generated by static electricity. Also, there is no possibility that the function of the authenticating system itself including the fingerprint sensor is impaired.

As described above, the information processor adopting the recognition system by which the person is recognized with his fingerprint is conventionally known. According to Japanese Unexamined Patent Publication No. 2000-194830, in order to prevent the occurrence of malfunction of the fingerprint distinguishing sensor and also in order to prevent the occurrence of failure in the function of the fingerprint distinguishing sensor, there is provided a mechanism for discharging static electricity, which has been charged in the user's body, to the ground on the information processor side.

However, according to the person authenticating system disclosed in Japanese Unexamined Patent Publication No. 2000-194830, the fingerprint distinguishing sensor is provided with a cover. When this cover is opened and the user's finger is inserted into the fingerprint distinguishing sensor, the person can be authenticated. However, it is not necessarily guaranteed that the user's hand comes into contact with the electrode for discharging before the user's finger comes into contact with the distinguishing sensor. Therefore, it is necessary for the user to be aware that his hand must come into contact with the electrode for discharging before the authentication of himself. Since this fingerprint distinguishing sensor is arranged in the mouse of the information processor, it is impossible to apply this system to any portable type information processor having no mouse.

SUMMARY OF THE INVENTION

Therefore, it is an object of the present invention to provide a fingerprint recognition device for authenticating a person by his fingerprint, characterized in that: before the finger of an operator comes into contact with the fingerprint sensor section, the electrical potential of the operator himself is made to be the same as the reference electrical potential (electrical potential of the ground) of the fingerprint recognition device, that is, the operator himself is electrically discharged.

Also, another object of the present invention is to provide a fingerprint recognition device for authenticating the person by his fingerprint, which is capable of being applied to a portable type device, characterized in that: before the operator is electrically discharged, fingers or other portions of the operator's body are prevented from carelessly coming into contact with the fingerprint recognition sensor.

According to the present invention, there is provided a fingerprint recognizing apparatus comprising a sensor section mounted on the apparatus body for detecting a fingerprint of an operator; a cover section movable between an open position and a closed position for protecting the sensor section in such a manner that an operator's finger is accessible to the sensor section when the cover is in the open position; and a contact section arranged on the apparatus body at a position where the operator's finger can easily come into contact therewith during an operator's action to open the cover, the contact section electrically connected to the ground of the apparatus body.

When the information processor is set in operation, immediately before the operator gains access to the fingerprint sensor face of the information processor so that the operator's fingerprint can be authenticated, the cover section is opened and, at the same time, the finger of the operator comes into contact with the contact section. Therefore, even if the operator is not aware of electrically discharging his body, static electricity of the body of the operator can be discharged to the electrical potential of the ground on the processor unit side immediately before the operator conducts the fingerprint recognition action.

The cover section is of the hinge type, so that it can be opened and closed. At a position on the unit casing side adjacent to the open end of the cover section, there is provided a recess, in which a portion of the finger of the operator is engaged, on the surface of the device casing, and the contact section is arranged in the recess section. Due to the above structure, when the cover section is opened being rotated round the hinge of the cover section, the operator's finger can be easily contacted with the contact section.

The open end of the cover section is gently curved in such a manner that the center of the open end is more protruded outwardly than the respective sides thereof. According to the curved profile of the open end of the cover section, the recess and the contact section are also curved. According to the above structure, the cover section can be easily opened. Therefore, the finger of the operator can be more positively contacted with the contact section.

At a position on the open end side of the cover section and also at a position on the device casing side corresponding to the position on the open end side of the cover section, there is provided a means for locking the cover section with the device casing. Because the above locking means is arranged, when the cover section is opened, the finger of the operator is necessarily hooked at the opened end side of the cover section. Therefore, even if the operator is not aware of electrically discharging static electricity from his body, the operator's finger previously comes into contact with the contact section immediately before the start of authentication of the fingerprint, and the static electricity can be discharged from his body onto the ground side.

The contact section is formed as a portion of the ground contact plate. The ground contact plate is fixed to the unit casing in the periphery of the contact section and fastened to the unit casing together with the fixing sheet for fixing a member composing the fingerprint sensor. Due to the above structure, even if the structure of the ground contact plate is simple, the ground contact plate can be positively fixed to the unit casing, and at the same time the ground contact plate can be positively made to come into electrical contact with the unit casing, the electrical potential of which is substantially the same as the electrical potential of the ground.

According to another aspect of the present invention, there is provided an electrical unit including a fingerprint recognizing apparatus, said unit comprising: a unit casing; the fingerprint recognizing apparatus mounted on the unit casing for detecting a fingerprint of an operator, the apparatus comprising: a sensor section; a cover movable between an open position and a closed position for protecting the sensor section; and a contact section arranged on a position of the unit casing where an operator's finger can easily come into contact therewith when the cover is opened by the operator, the contact section electrically connected to the ground of the unit casing.

According to further aspect of the present invention, there is provided an electrical unit including a fingerprint recognizing apparatus, said unit comprising: a unit body comprising a data input section and a data processing section for processing data input from the data input section; a display section for displaying letters and images; and the fingerprint recognizing apparatus mounted on the unit casing for detecting a fingerprint of an operator, the apparatus comprising: a sensor section; a cover movable between an open position and a closed position for protecting the sensor section; and a contact section arranged on a position of the unit casing where an operator's finger can easily come into contact therewith when the cover is opened by the operator, the contact section electrically connected to the ground of the unit casing.

DETAILED DESCRIPTION OF THE PREFERRED EMBODIMENTS

Referring now to the appended drawings, an embodiment of the present invention will be explained in detail below.

Figure 1:
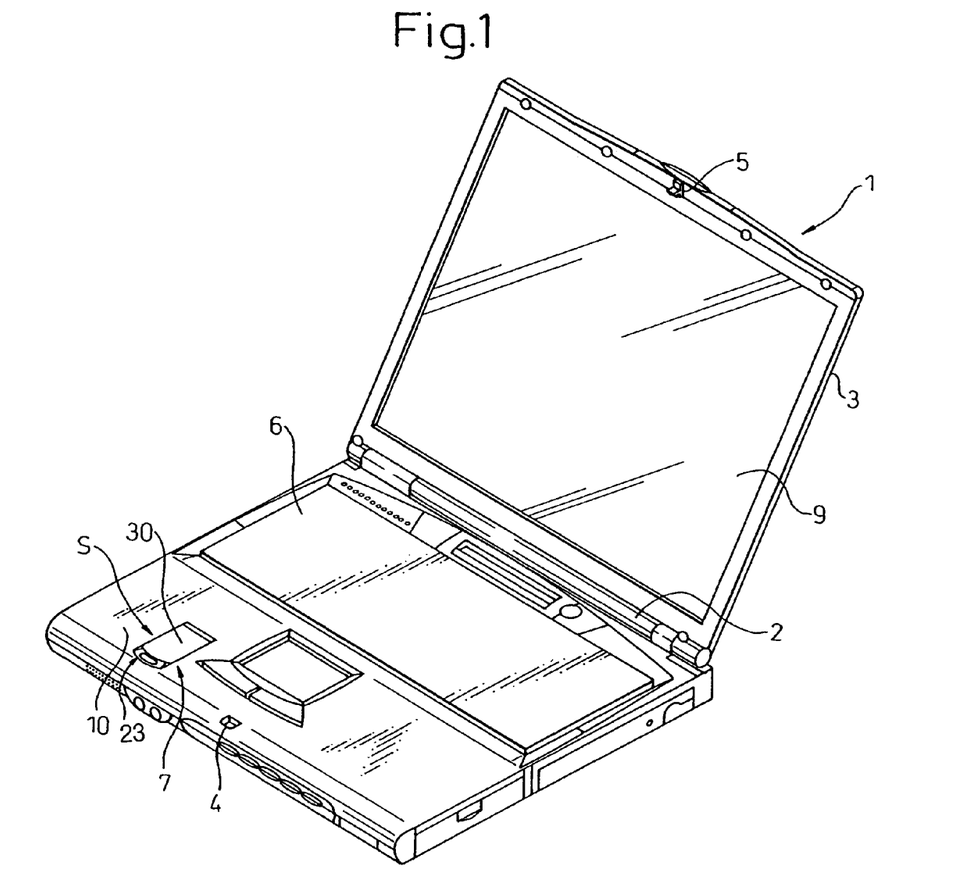
FIG. 1 is a perspective view showing an appearance of an information processor having a fingerprint recognition device of the present invention.

FIG. 1 is a perspective view showing an appearance of an information processor to which the present invention is applied, especially showing an appearance of a note book type personal computer. In FIG. 1, the information processor is composed of a processor body 1 and a cover section 3 which is pivotally connected with the processor body 1 by a hinge section 2. Due to the above structure, the cover section 3 can be opened and closed with respect to the processor body 1.

When the cover section 3 is closed, an engaging section 4 of the processor body 1 is engaged with an engaging section 5 of the cover section 3. Therefore, the cover section 3 can be fixed to the processor body 1 under the condition that the cover section 3 is closed, so that the cover section 3 can not be carelessly opened.

The processor body 1 includes: an input section 6 such as a keyboard for inputting characters, images and other data; and a fingerprint recognition device s. This fingerprint recognition device s includes: a fingerprint sensor 7; a cover section 30; and a contact section 23. The fingerprint sensor 7 for detecting fingerprints of an operator is arranged in a palm rest section 10 of the information processor and provided with the cover section 30 for protecting the fingerprint sensor 7 as described later.

The cover section 3 of the device is provided with a display 9 for displaying characters, images and other data to be processed by the image processor. While watching this display 9, the operator operates the keyboard and mouse (not shown) of the input section 6.

This information processor may be used as a stationary type information processor which is put on a desk. Of course, this information processor may be used as a portable type information processor.

Figure 2:
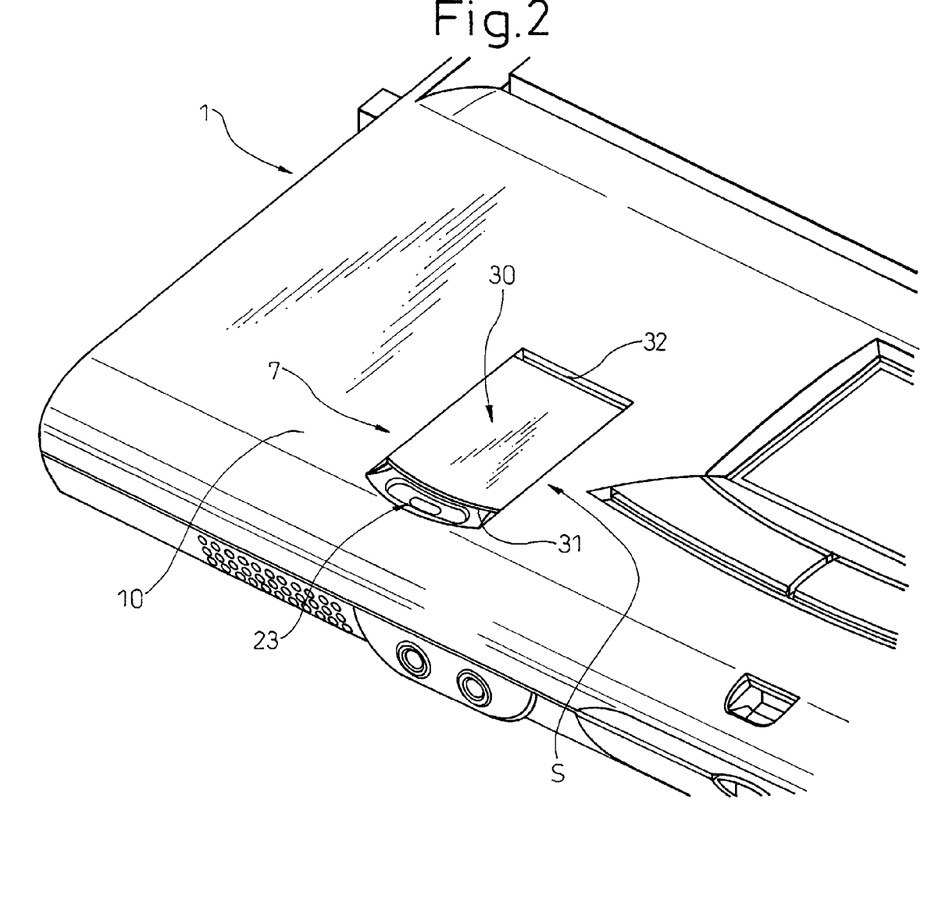
FIG. 2 is a perspective view showing a fingerprint recognition device, the cover section of which is closed.
Figure 3:
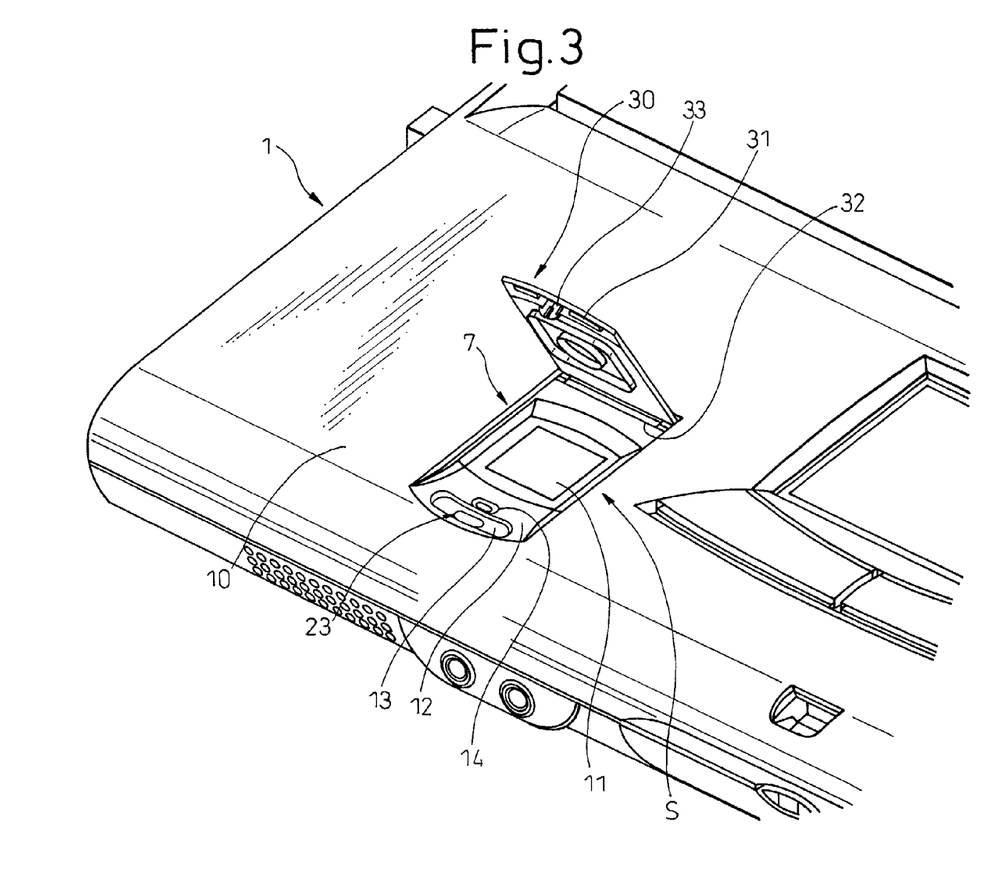
FIG. 3 is a perspective view showing a fingerprint recognition device, the cover section of which is opened.

FIGS. 2 and 3 are perspective views of the fingerprint recognition device shown in FIGS. 2 and 3. FIG. 2 is a perspective view showing a state in which the cover section 30 is closed, and FIG. 3 is a perspective view showing a state in which the cover section 30 is opened.

As shown in the drawing, in this embodiment, the fingerprint sensor section 7 is arranged on substantially the same face as the face of the input section 6 of the processor body 1. Especially, the fingerprint sensor section 7 is arranged on the same surface as that of the palm rest 10 of the device casing. When the surface of the cover section 30 coincides with the surface of the palm rest of the device casing under the condition that the cover section 30 is closed, both the surfaces form a substantially smooth plane. Therefore, in the case of usual operation of the information processor conducted after the fingerprints have been authenticated, there is no possibility that the fingerprint recognition device blocks the input operation of the input section 6 such as the keyboard, and further there is no possibility that the operator will feel any discomfort.

However, the fingerprint recognition device may be arranged at any position of the information processor as long as the operator can conveniently apply his fingers for authenticating the person when the operator starts operating the information processor.

The fingerprint sensor section 7 is a little recessed to the inside of the casing compared with the surface of the palm rest section 10 of the device casing. The periphery of the fingerprint sensor section 7 is formed into an inclined section 12, and the central portion of the fingerprint sensor section 7 is formed into a sensor glass face 11. This sensor glass face 11 is a plane which is substantially parallel with the palm rest surface of the device casing 11.

When the cover section 30 is closed, it completely covers the sensor glass face 11. Therefore, the fingerprint sensor section 7 including the sensor glass face 11 is protected by the cover section 30. The cover section 30 is capable of being opened and closed by a hinge with respect to the unit casing. The cover section 30 includes: one end (free end) side 31 at which the operator's finger is hooked so that the cover section 30 can be opened; and the other end (base end) side on which the hinge 32 is provided. There is provided a gently inclined section 12 adjacent to one end side 31, and also there is provided a recess section 13 in the inclined section 12.

A contact section 23 described later is protruded or exposed from a long circular hole formed at the center of the recess 13. When the operator hooks his finger at the open end section of the cover section 30 and tries to open the cover section 30, a portion of his finger enters the recess section 13 and positively comes into contact with the contact section 23. Due to the foregoing, the electrical potential of static electricity charged to the body of the operator can be made to be the same as the electrical potential of the ground which is the reference electrical potential of the information processor. That is, static electricity can be discharged from the body of the operator.

Inside the open end 31 of the cover section 30, there is provided an engaging protrusion 33. On the other hand, on the casing side, especially in the inclined section 12, there is provided an engaging section 14 which is engaged with the engaging protrusion 33. When the engaging protrusion 33 is elastically engaged with the engaging section 14 in the case of closing the cover section 30, the cover section 30 is locked so that it can not be easily opened. Accordingly, when the operator releases the lock between the engaging section 14 and the engaging protrusion 33 by hooking his finger at the open end 31 of the cover section 30 so that the cover section 30 can be opened for authenticating the person before the operator operates the device, the operator's finger positively comes into contact with the contact section 23.

Figure 4:
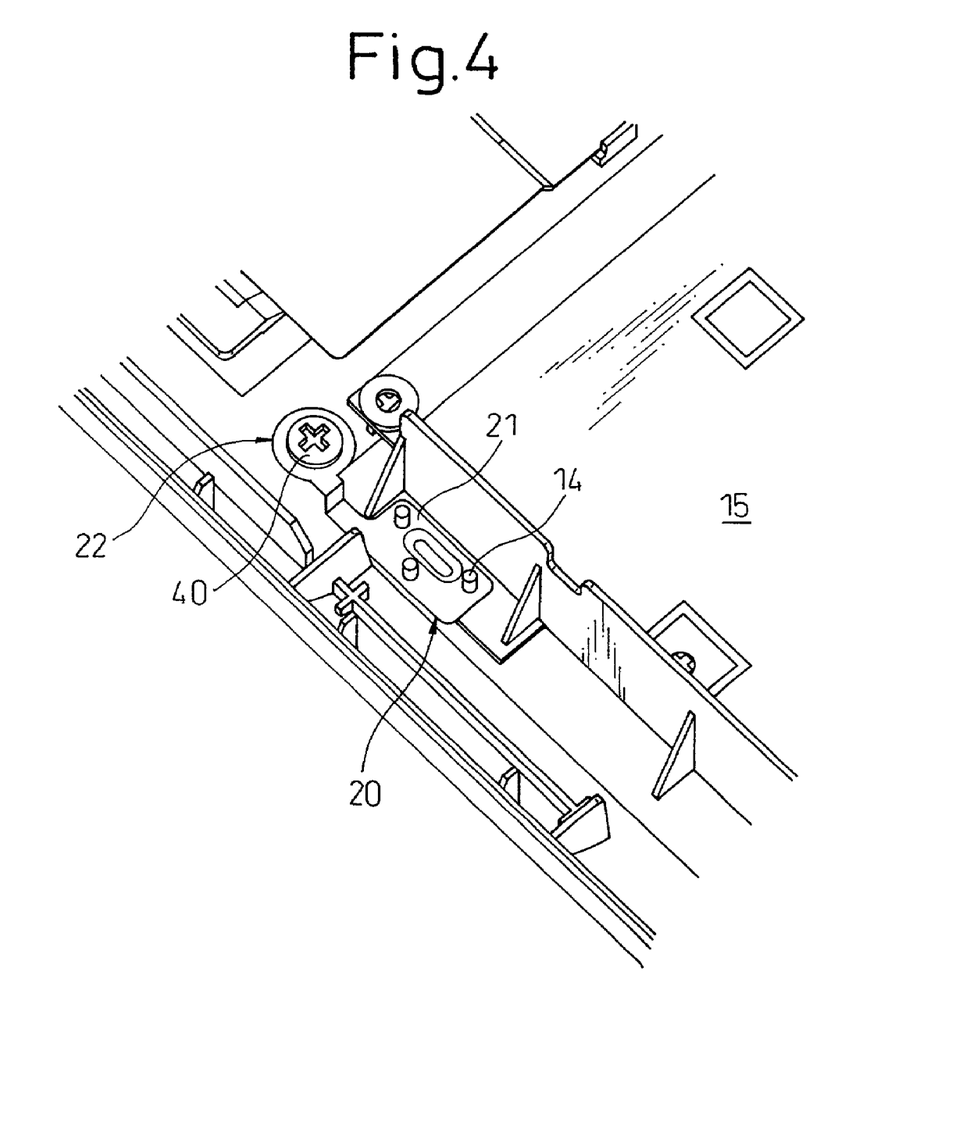
FIG. 4 is a perspective view showing a ground contact section in a state in which a sensor fixing sheet is detached, wherein the view is taken from the reverse side of a device casing.
Figure 5:
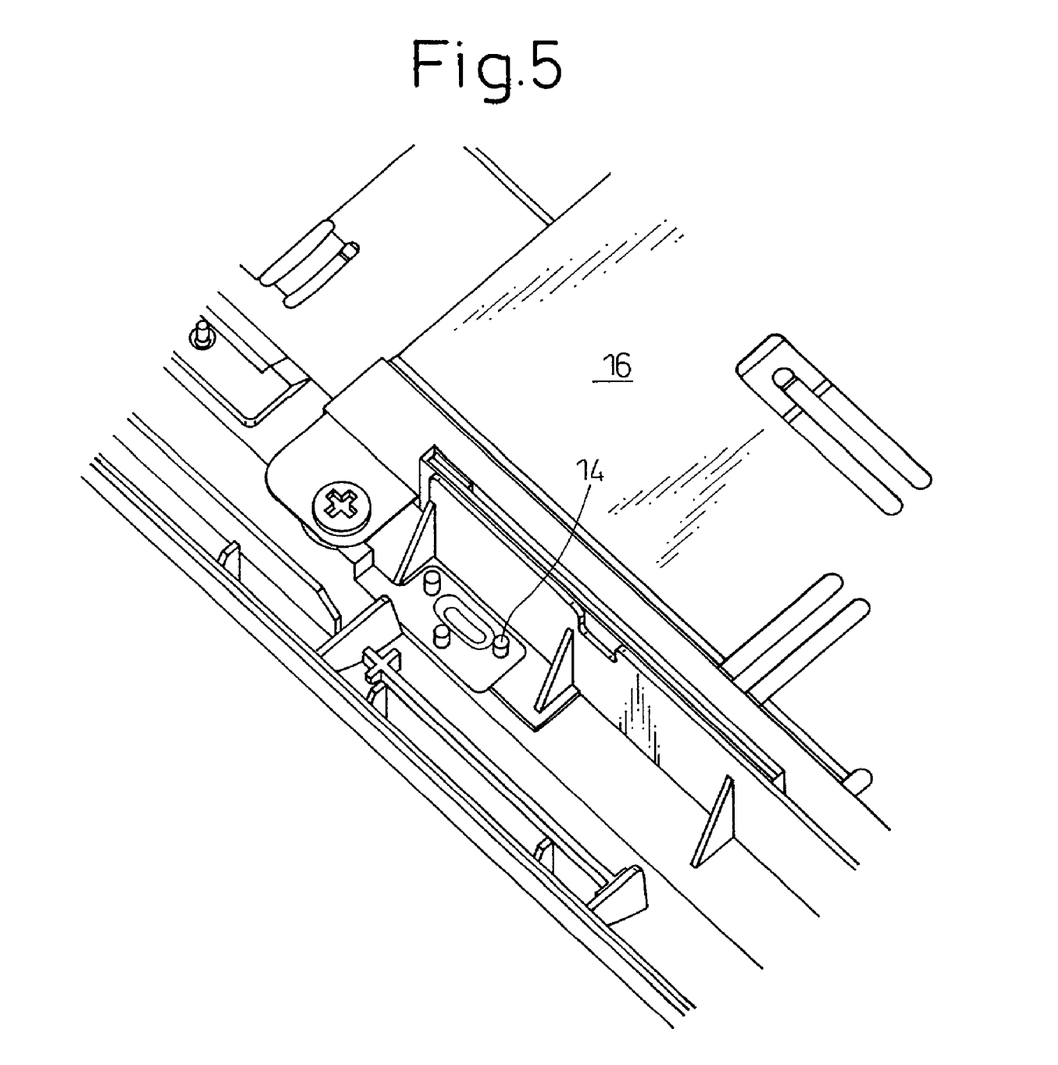
FIG. 5 is a perspective view showing a ground contact section in a state in which a sensor fixing sheet is attached, wherein the view is taken from the reverse side of a device casing.
Figure 6:
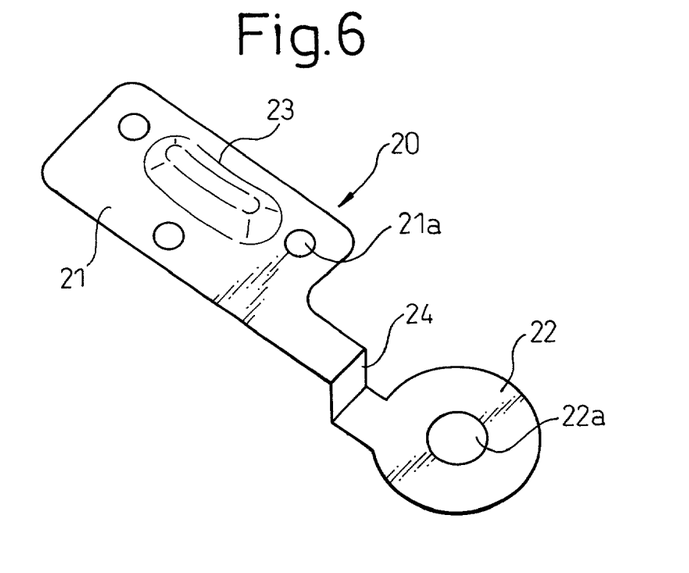
FIG. 6 is a perspective view showing a ground contact sheet.
Figure 7A:
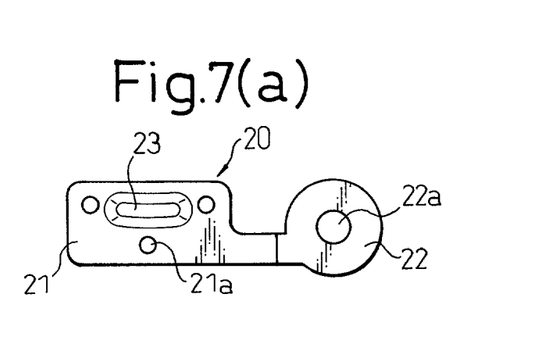
FIGS. 7(a), 7(b) and 7(c) are respectively a plan view, front view and side view of the ground contact sheet.
Figure 7B:
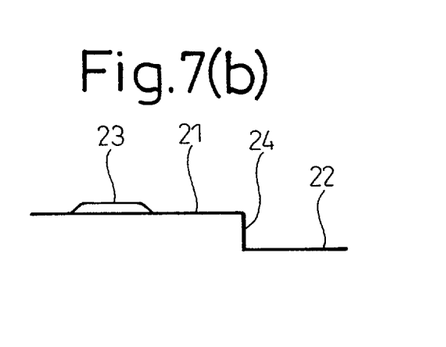
Figure 7C:
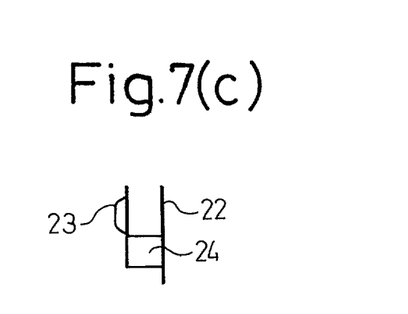

FIGS. 4 and 5 are views showing the contact section 23 coming into contact with the electrical potential of the ground and also showing the periphery of the contact section 23, wherein these views are taken from the reverse side of the device casing. FIG. 4 is a view showing a state in which the sensor fixing sheet is detached, and FIG. 5 is a view showing a state in which the sensor fixing sheet is attached. FIG. 6 is a perspective view showing the ground contact sheet. FIGS. 7(a), 7(b) and 7(c) are respectively a plan view, front view and side view of the ground contact plate.

The ground contact plate 20 is composed of a conductive metal sheet formed by means of punching. The ground contact plate 20 includes: a fixing section 21, screwing section 22, contact section 23, and folding section 24. The fixing section 21 has rivet holes 21a for fixing the ground contact plate 20 to the device casing. In this embodiment, there are formed three rivet holes 21a in the periphery of the contact section 23. The contact section 23 is a substantially long circular protrusion. This protruding contact section 23 is formed into a profile suitable for the long circular hole of the recess section 13.

In the palm rest cover section of the processor unit casing, pins 14 are protruded from the reverse face at positions corresponding to the positions of the rivet holes on the ground contact plate 20. After the pins 14 have been inserted into the rivet holes 21a on the ground contact sheet 20, the pins 14 made of heat fusion type material such as resin are heat-fused by a conventional method, and the ground contact plate 20 can be fixed onto the reverse face of the device casing. Due to the foregoing, the protruding contact section 23 is formed to be the same face as the face of the recess section 13 or the protruding contact section 23 is formed to be protruded upward a little.

The screwing section 22 is arranged on the opposite side to the fixing section 21 via the folding section 24 and is provided with the screw hole 22a for electrically connecting the ground contact plate 20 with the device casing, the electrical potential of which is the same as the electrical potential of the ground. The screwing section 22 is fixed to a screw hole (not shown) formed on the device casing side by the screw 40. FIG. 4 is a view showing a state in which the sensor fixing plate is removed. However, actually, as shown in FIG. 5, the screw 40 is made to pass through and is screwed into the hole formed at the corner of the sensor fixing plate 16 and also into the hole 22a of the ground contact plate 20, so that both the ground contact plate 20 and the sensor fixing sheet 16 can be fastened, together, to the device casing. The folding section 24 is provided so that it can be adapted to a step portion formed between the fixing section 21 having the contact section 23 exposed onto the surface of the palm rest of the device casing and the print board 15 for detecting a fingerprint having the thickness of the fingerprint sensor section.

The sensor fixing plate 16 is provided for fixing the fingerprint sensor section 7. Especially, the sensor fixing plate 16 is provided for fixing the components of the fingerprint recognition device including the sensor glass face 11 and also for fixing the printed circuit board 15 for detecting a fingerprint to the unit casing. For the fingerprint recognition device itself, it is possible to use the conventional fingerprint recognition device as described before, for example, it is possible to use the fingerprint recognition device as disclosed in Japanese Unexamined Patent Publication No. 11-185016.

That is, the operation of fingerprint recognition is conducted as follows. When a finger is pressed against the sensor glass face 11, a shadow is formed by the finger. This shadow of the finger is optically detected. A profile of the distribution of the thus detected shadow is collated to the profile of the distribution of the fingerprint of the operator which has already been registered in this device. When it is judged that the profile of the distribution of the thus detected shadow agrees with the profile of the distribution of the fingerprint of the operator, the electric power source of the information processor is turned on, and information can be input into the information processor, and specific data can be processed and displayed. When it is judged that the profile of the distribution of the thus detected shadow does not agree with the profile of the distribution of the fingerprint of the operator, of course, the above operation can not be performed.

Figure 8:
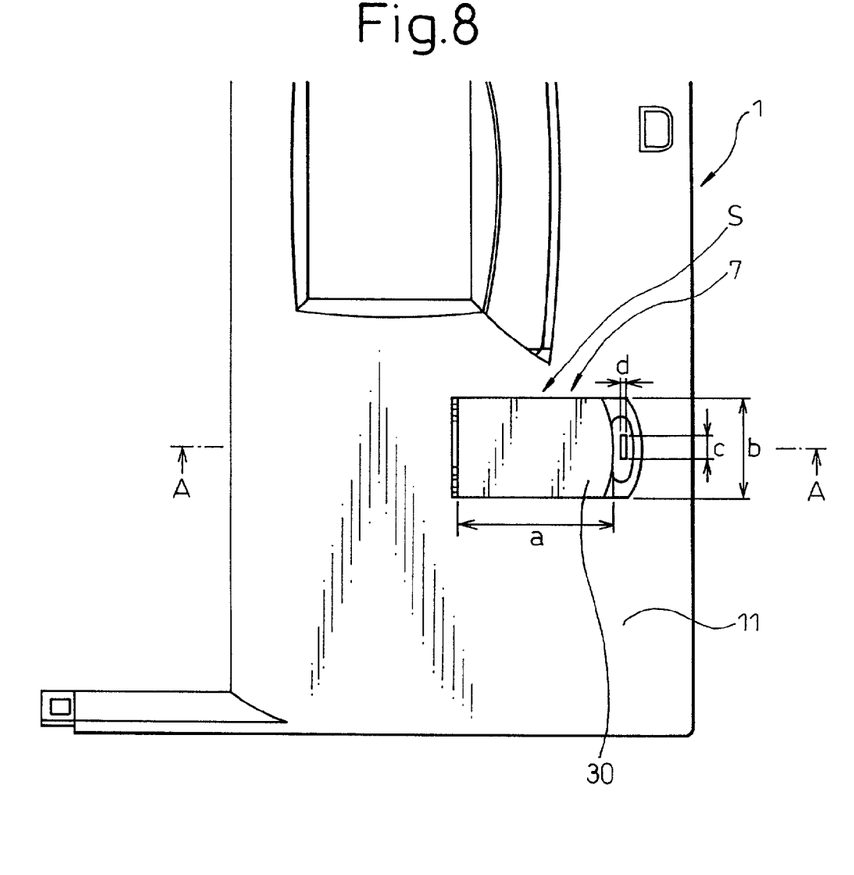
FIG. 8 is a plan view of the fingerprint recognition device.

As can be seen in FIGS. 2 and 8, the open end side 31 of the cover section 30 is curved in such a manner that the central portion of the open end side 31 of the cover section 30 is protruded outward beyond the respective sides thereof. Therefore, the substantially long circular protruding contact section 23 of the ground contact plate 20 and the substantially long circular hole on the unit casing side, the profile of which corresponds to the profile of the contact section 23, are gently curved corresponding to the curvature profile of the open end side 31 of the cover section 30. Further, the recess section 13 on the unit casing side, in which a portion of the finger is engaged, is gently curved in the same manner according to the profile of the contact section 23.

Figure 9:
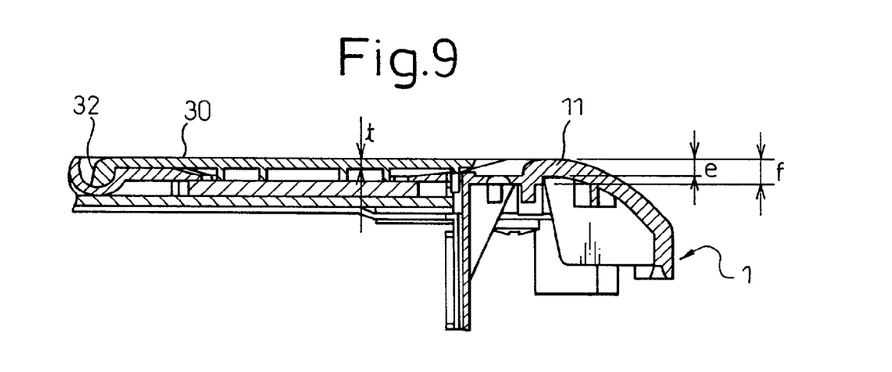
FIG. 9 is a cross-sectional view taken along line A-A in FIG. 8.

Referring to FIGS. 8 and 9, the specific structure of the fingerprint sensor section 7 of the information processor of the present invention will be further explained as follows. For example, a dimensional relation will be explained in a typical embodiment shown in FIG. 8. Concerning the cover section 30, the dimensional relation is described as follows. Dimension "a" from the open side end portion to the hinge side end portion was 40 mm, lateral width "b" is 25 mm, length "c" of the contact section 23 was 6.4 mm, and the width of the contact section 23 was 2 mm. In FIG. 9, depth "e" of the recess portion 13 from the cover surface of the palm rest of the device casing was 1.8 mm, and dimension "f" from the cover surface of the palm rest to the fixing section 21 of the ground contact plate 20 was 2.6 mm.

Due to the above dimensional relation, in the case where thickness "t" of the cover section 30 is 1 mm, before the authentication of the person conducted by an operator with his fingerprint in such a manner that the operator hooks his finger at the front central end portion of the cover section 30 on the open side 31 so as to open the cover section 30 for the authentication and the cover section 30 is opened and the finger is pressed against the glass face 11, a portion of the operator's finger positively comes into contact with the contact section 23 of the ground contact plate 20. Due to the foregoing, the operator himself is electrically connected to the casing section of the information processor via his finger and, especially, connected to the frame ground portion of the information processor via the fixing section 21 of the ground contact plate 20 and the locking screw section 22. Accordingly, the electrical potential of static electricity of the operator himself can be made to be the same level as the level of the electrical potential of the ground of the information processor.

When the electrical potential of the operator himself is made to be the same as the electrical potential of the ground as described above, it is possible to detect a fingerprint without the fingerprint sensor section 7 being affected by the static electricity charged to the operator. Therefore, safety of the fingerprint recognition device can be enhanced.

Figure 10:
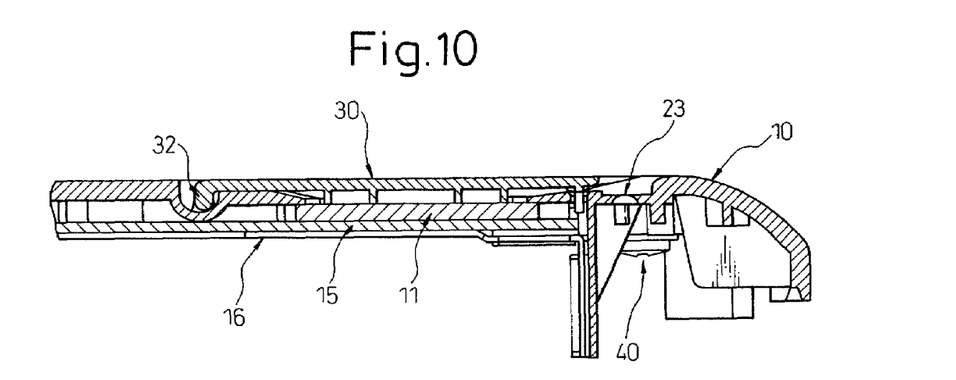
FIG. 10 is a cross-sectional view taken along line A-A in FIG. 8, in which the cover section is closed.
Figure 11:
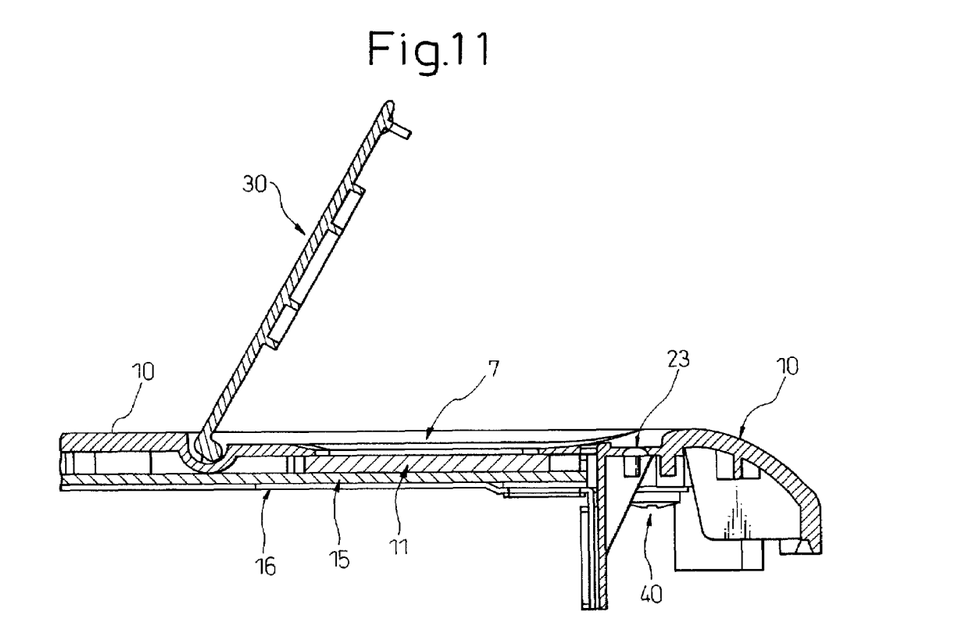
FIG. 11 is a cross-sectional view taken along line A-A in FIG. 8, in which the cover section is opened.

FIGS. 10 and 11 are cross-sectional views taken on line A-A in FIG. 8. FIGS. 10 and 11 respectively show a state in which the cover section 30 is closed and a state in which the cover section 30 is opened. In this embodiment, for example, the cover section 30 is made of resin, and the hinge end portion 32 of the cover section 30 is engaged with the device casing side, so that the cover section 30 can be opened and closed. However, the present invention is not limited to the above hinge type cover section 30. For example, although not shown in the drawing, a sliding type cover section 30 may be adopted. In this case, the cover section is opened when a finger is hooked at an end portion of the cover section on the side adjacent to the contact section 23.

The embodiment of the present invention includes a locking means for locking the cover section 30 in a closed state. This locking means includes: an engaging protrusion 33 arranged at the end portion of the cover section 30 on the open side; and an engaging section 14 arranged at a position on the unit casing side corresponding to the engaging protrusion 33. Due to the above structure, when the cover section 30 is opened, it is necessary for an operator to hook his finger at the open end side of the cover section 30. Accordingly, immediately before the authentication of the fingerprint, the electrical potential of the operator is made to be equal to the electrical potential of the ground even if the operator is not aware of discharging static electricity charged from his body. Accordingly, it is possible to positively and safely prevent the fingerprint sensor section from being affected by static electricity charged in the operator's body.

The embodiment and example of the present invention is explained above, in detail, by referring to the accompanying drawings. However, it should be noted that the present invention is not limited to the above specific embodiment and example, and changes may be made by one skilled in the art without departing from the spirit and scope of the present invention.

As explained above, according to the present invention, when the device is started and immediately before an operator gains access to the fingerprint sensor for the authentication of his fingerprint, the operator must open the cover section. When this cover section is operated and, for example, when this cover section is opened, the operator's finger comes into contact with the contact section which is electrically connected with the electrical potential of the ground on the device side. Accordingly, even if the operator is not aware of discharging static electricity from his body, it possible for the operator to discharge it immediately before the authentication of the fingerprint. Consequently, it is possible to guarantee that the fingerprint recognition device operates safely and accurately over a long period of time.

The invention claimed is:

1. A fingerprint recognizing apparatus comprising:
a sensor section mounted on an apparatus body for detecting a fingerprint of an operator;
a cover movable between an open position and a closed position for protecting the sensor section in such a manner that an operator's finger can access the sensor section when the cover is in the open position; and
a contact section arranged on the apparatus body at a position where the operator's finger can easily come into contact therewith during an operator's action to open the cover, the contact section being electrically connected to a ground of the apparatus body,
wherein the cover has one free end and another base end and is moved between the open and closed positions,
wherein the contact section is a separate element from the cover, and
wherein said contact section is disposed in a recess surrounded by an inclined portion and said one free end of the cover is adjacent to said inclined portion when it is in the closed position.

2. A fingerprint recognizing apparatus, as set forth in claim 1, wherein the cover is moved between the open and closed positions by means of a hinge provided at the base end of the cover.

3. A fingerprint recognizing apparatus, as set forth in claim 1, further comprising a locking means for locking the cover in its closed position, the locking means comprising a first engaging member provided at the free end of the cover and a second engaging member provided at a position corresponding to the first engaging member so that the first and second engaging members are mutually engaged with each other when the cover is in its closed position.

4. A fingerprint recognizing apparatus comprising:
a sensor section mounted on an apparatus body for detecting a fingerprint of an operator;
a cover movable between an open position and a closed position for protecting the sensor section in such a manner that an operator's finger can access the sensor section when the cover is in the open position; and
a contact section arranged on the apparatus body at a position where the operator's finger can easily come into contact therewith during an operator's action to open the cover, the contact section being electrically connected to a ground of the apparatus body,
wherein the cover has one free end and another base end and is moved between the open and closed positions by means of a hinge provided at the base end of the cover,
wherein the contact section is arranged in a recess which is provided on the apparatus body at a position near to the free end of the cover when it is in the closed position,
wherein the contact section is a separate element from the cover, and
wherein said recess is surrounded by an inclined portion and said one free end of the cover is adjacent to said inclined portion when it is in the closed position.

5. A fingerprint recognizing apparatus comprising:
a sensor section mounted on an apparatus body for detecting a fingerprint of an operator;
a cover movable between an open position and a closed position for protecting the sensor section in such a manner that an operator's finger can access the sensor section when the cover is in the open position; and
a contact section arranged on the apparatus body at a position where the operator's finger can easily come into contact therewith during an operator's action to open the cover, the contact section being electrically connected to a ground of the apparatus body,
wherein the cover has one free end and another base end and is moved between the open and closed positions by means of a hinge provided at the base end of the cover,
wherein the free end of the cover is gently curved in such a manner that a central portion thereof is protruded outwardly more than respective side portions thereof,
wherein the contact section is a separate element from the cover, and
wherein said contact section is disposed in a recess surrounded by an inclined portion and said one free end of the cover is adjacent to said inclined portion when it is in the closed position.

6. A fingerprint recognizing apparatus, as set forth in claim 5, wherein the contact section is arranged in a recess, and the recess and the contact section are also curved along with a curvature profile of the cover.

7. An electrical unit including a fingerprint recognizing apparatus, said unit comprising:
a unit casing;
the fingerprint recognizing apparatus mounted on the unit casing for detecting a fingerprint of an operator, the apparatus comprising:
a sensor section;
a cover movable between an open position and a closed position for protecting the sensor section; and
a contact section arranged at a position on the unit casing where an operator's finger can easily come into contact therewith when the cover is opened by the operator, the contact section being electrically connected to a ground of the unit casing,
wherein the cover has one free end and another base end and is moved between the open and closed positions,
wherein the contact section is a separate element from the cover, and
wherein said contact section is disposed in a recess surrounded by an inclined portion and said one free end of the cover is adjacent to said inclined portion when it is in the closed position.

8. An electrical unit, as set forth in claim 7, wherein the cover is moved between the open and closed positions by means of a hinge provided at the base end of the cover.

9. An electrical unit, as set forth in claim 7, wherein the fingerprint recognizing apparatus further comprises a locking means for locking the cover in its closed position, the locking means comprising a first engaging member provided at the free end of the cover and a second engaging member provided at a position corresponding to the first engaging member so that the first and second engaging members are mutually engaged with each other when the cover is in its closed position.

10. An electrical unit, as set forth in claim 7 further comprising a mounting plate for rigidly securing the fingerprint recognizing apparatus to the unit casing by means of a screw.

11. An electrical unit including a fingerprint recognizing apparatus, said unit comprising:
   a unit casing;
   the fingerprint recognizing apparatus mounted on the unit casing for detecting a fingerprint of an operator, the apparatus comprising:
   a sensor section;
   a cover movable between an open position and a closed position for protecting the sensor section; and
   a contact section arranged at a position on the unit casing where an operator's finger can easily come into contact therewith when the cover is opened by the operator, the contact section being electrically connected to a ground of the unit casing,
   wherein the cover has one free end and another base end and is moved between the open and closed positions by means of a hinge provided at the base end of the cover,
   wherein the contrast section is arranged in a recess which is provided on the unit casing at a position near to the free end of the cover when it is in the closed position,
   wherein the contact section is a separate element from the cover, and
   wherein said recess is surrounded by an inclined portion and said one free end of the cover is adjacent to said inclined portion when it is in the closed position.

12. An electrical unit as set forth in claim 11, wherein the free end of the cover is gently curved in such a manner that a central portion thereof is protruded outwardly more than respective side portions thereof.

13. An electrical unit, as set forth in claim 12, wherein the recess and the contact section are also gently curved along with a curvature profile of the cover.

14. An electrical unit including a fingerprint recognizing apparatus, said unit comprising:
   a unit casing;
   the fingerprint recognizing apparatus mounted on the unit casing for detecting a fingerprint of an operator, the apparatus comprising:
   a sensor section;
   a cover movable between an open position and a closed position for protecting the sensor section; and
   a contact section arranged at a position on the unit casing where an operator's finger can easily come into contact therewith when the cover is opened by the operator, the contact section being electrically connected to a ground of the unit casing,
   a ground contact plate which is rigidly connected to the unit casing, the contact section is formed as a part of the ground contact plate, and
   wherein the cover has one free end and another base end and is moved between the open and closed positions,
   wherein the contact section is a separate element from the cover, and
   wherein said contact section is disposed in a recess surrounded by an inclined portion and said one free end of the cover is adjacent to said inclined portion when it is in the closed position.

15. An information processing unit including a fingerprint recognizing apparatus, said unit comprising:
   a unit casing comprising a data input section and a data processing section for processing data input from the data input section;
   a display section for displaying letters and images; and
   the fingerprint recognizing apparatus mounted on the unit casing for detecting a fingerprint of an operator, the apparatus comprising:
   a sensor section;
   a cover movable between an open position and a closed position for protecting the sensor section; and
   a contact section arranged at a position on the unit casing where an operator's finger can easily come into contact therewith when the cover is opened by the operator, the contact section electrically connected to a ground of the unit casing,
   wherein the cover has one free end and another base end and is moved between the open and closed positions,
   wherein the contact section is a separate element from the cover, and
   wherein said contact section is disposed in a recess surrounded by an inclined portion and said one free end of the cover is adjacent to said inclined portion when it is in the closed position.

* * * * *